United States Patent (10) Patent No.: US 6,749,096 B1
Manos (45) Date of Patent: Jun. 15, 2004

(54) BEACH CHAIR HOLDER FOR BICYCLE

(76) Inventor: John Louis Manos, 35 Taylor St., Staunton, VA (US) 24401

( * ) Notice: Subject to any disclaimer, the term of this patent is extended or adjusted under 35 U.S.C. 154(b) by 164 days.

(21) Appl. No.: 09/975,947

(22) Filed: Oct. 15, 2001

(51) Int. Cl.⁷ ................................................. B62J 11/00
(52) U.S. Cl. ....................... 224/456; 224/412; 224/441; 224/443; 224/446; 224/448
(58) Field of Search ................. 224/456, 447, 224/412, 419, 422, 441, 443, 446, 448, 459, 461, 413, 409, 922; 24/455, 460, 513; 248/230.2

(56) References Cited

U.S. PATENT DOCUMENTS

| | | | |
|---|---|---|---|
| 460,332 A | 9/1891 | Coates | |
| 643,373 A | 2/1900 | Gabriel et al. | |
| 2,055,842 A | * 9/1936 | Haislip | 248/517 |
| 2,248,170 A | * 7/1941 | Hansen | 224/570 |
| 3,142,424 A | 7/1964 | Reed, Jr. | |
| 3,167,284 A | * 1/1965 | Lynch | 224/422 |
| 3,648,908 A | * 3/1972 | Thompson | 224/442 |
| 4,183,418 A | 1/1980 | Dudas | |
| 4,296,878 A | 10/1981 | Ward et al. | |
| 4,387,836 A | 6/1983 | Laesch | |
| 4,396,135 A | * 8/1983 | Lundgren | 211/60.1 |
| 4,770,326 A | * 9/1988 | Thompson | 224/418 |
| 4,819,217 A | * 4/1989 | Houlihan | 368/10 |
| 5,207,361 A | * 5/1993 | Slifka | 224/274 |
| 5,448,402 A | * 9/1995 | Lorenzana | 116/28 R |
| 5,482,194 A | 1/1996 | Hallock, III | |
| 5,487,554 A | 1/1996 | May | |
| 5,542,587 A | 8/1996 | Broz et al. | |
| 5,667,118 A | 9/1997 | Faasse | |
| 5,687,894 A | * 11/1997 | Cavallaro | 224/448 |
| 5,803,329 A | 9/1998 | Weissenberger et al. | |
| 5,961,015 A | * 10/1999 | Shirakawa | 224/426 |
| 6,092,820 A | 7/2000 | Evans | |
| 6,237,821 B1 | * 5/2001 | Owen | 224/200 |
| 6,273,391 B1 | * 8/2001 | Engolia | 224/422 |

* cited by examiner

*Primary Examiner*—Gregory Vidovich
*Assistant Examiner*—Maerena W. Brevard
(74) *Attorney, Agent, or Firm*—Stephen Christopher Swift; Swift Law Office

(57) ABSTRACT

An apparatus for and method of retaining a beach chair (or other object having metal tubing) on a bicycle (or other wheeled vehicle). The apparatus includes a metal plate, having a hole in its middle, at which it is attached to a bolt extending from the axle of the rear wheel of the bicycle or other vehicle. At one end of the plate is a metallic cylindrical clamp with an interior lining of rubber (or other elastic material). The aluminum tubing of a beach chair may be retained in the cylindrical clamp, to carry the beach chair on the vehicle. The cylindrical clamp has two longitudinal sections, that may opened and securely closed using a lever. There is a notch at the other end of the plate, by which it may be retained on the frame of the bicycle or other vehicle, to prevent it from turning on the axle.

15 Claims, 4 Drawing Sheets

BEACH CHAIR HOLDER FOR BICYCLE

BACKGROUND OF THE INVENTION

1. Field of the Invention

The present invention relates to a device by which a beach chair, or a similar object having metal tubing, may be retained on a bicycle, or a similar wheeled vehicle.

2. Description of the Prior Art

There have been previous inventions for retaining objects on bicycles or tricycles, but none that can clamp a beach chair (or similar object) by its aluminum (or other metal) tubing, by an apparatus that is attached to the axle of the bicycle's wheel.

U.S. Pat. No. 460,332, issued on Sep. 29, 1891, to Robert Coates, discloses a combined stand and carrier for bicycles. The instant invention is distinguishable, in that it is attached to the hub or axle of a wheel of a bicycle.

U.S. Pat. No. 643,373, issued on Feb. 13, 1900, to Albert A. Gabriel and Edward M. Atkinson, discloses a parcel rest and seat annex for bicycles. The instant invention is distinguishable, in that it has a clamp suitable for retaining metal tubing.

U.S. Pat. No. 3,142,424, issued on Jul. 28, 1964, to J. R. Reed, Jr., discloses a gun holder for bicycles, which is mounted on the axle of the rear wheel, but a without clamp suitable for retaining metal tubing, as in the instant invention.

U.S. Pat. No. 4,183,418, issued on Jan. 15, 1980, to Herminia Dudas, discloses a tricycle apparatus having a housing surrounding the rear axle.

U.S. Pat. No. 4,296,878, issued on Oct. 27, 1981, to Franklin A. Ward and Rock A. Engeman, discloses a surfboard carrier with a supporting member attached to the rear axle of a bicycle.

U.S. Pat. No. 4,387,836, issued on Jun. 14, 1983, to Daniel A. Laesch, discloses a golf bag carrier to be mounted over the rear wheel of a bicycle.

U.S. Pat. No. 5,482,194, issued on Jan. 9, 1996, to Orrin S. Hallock, III, discloses a folding bicycle rack having legs attached to the rear axle of a bicycle, but without a clamp suitable for retaining metal tubing, as in the instant invention.

U.S. Pat. No. 5,487,554, issued on Jan. 30, 1996, to William A. May, discloses a bicycle training apparatus, with supporting members attached to the rear axle of the bicycle, but without any clamp for retaining metal tubing.

U.S. Pat. No. 5,542,587, issued on Aug. 6, 1996, to Jayne I. Broz and Gordon A. Broz, discloses an infant carrier installable on a bicycle, with supporting members attached near to the axle of the rear wheel.

U.S. Pat. No. 5,667,118, issued on Sep. 16, 1997, to James P. Faasse, discloses a panniers rack attachable to the front wheel of a bicycle.

U.S. Pat. No. 5,803,329, issued on Sep. 8, 1998, to Heinz Weissenberger and Sylvain Thevoz, discloses a carrier rack for two-wheeled vehicle, in particular for a bicycle.

U.S. Pat. No. 6,092,820, issued on Jul. 25, 2000, to Ross N. Evans, discloses an apparatus and method for transporting cargo with a two-wheeled vehicle.

None of the above inventions and patents, taken either singly or in combination, is seen to describe the instant invention as claimed.

SUMMARY OF THE INVENTION

The invention is an apparatus and method using a metal plate, having a hole in its middle, at which it is attached to the axle of the rear wheel of a bicycle or other vehicle. At one end of the plate is a metallic C-clamp with a rubber interior lining. The aluminum tubing of a beach chair may be retained in the C-clamp, to carry the beach chair on the bicycle. There is a notch at the other end of the plate, by which it may be retained on the frame of the bicycle, to prevent it from turning on the axle.

Accordingly, it is a principal object of the invention to provide a means for carrying a beach chair on a bicycle.

It is another object of the invention to provide a means for carrying a beach chair on a tricycle or other wheeled vehicle.

It is a further object of the invention to provide a means for carrying any suitable object having metal tubing on a bicycle.

Still another object of the invention is to provide a means for carrying any suitable object having metal tubing on a tricycle or other wheeled vehicle.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is an apparatus and method by which a beach chair, or a similar object having metal tubing, may be retained on a bicycle, or a similar wheeled vehicle.

Figure 1:
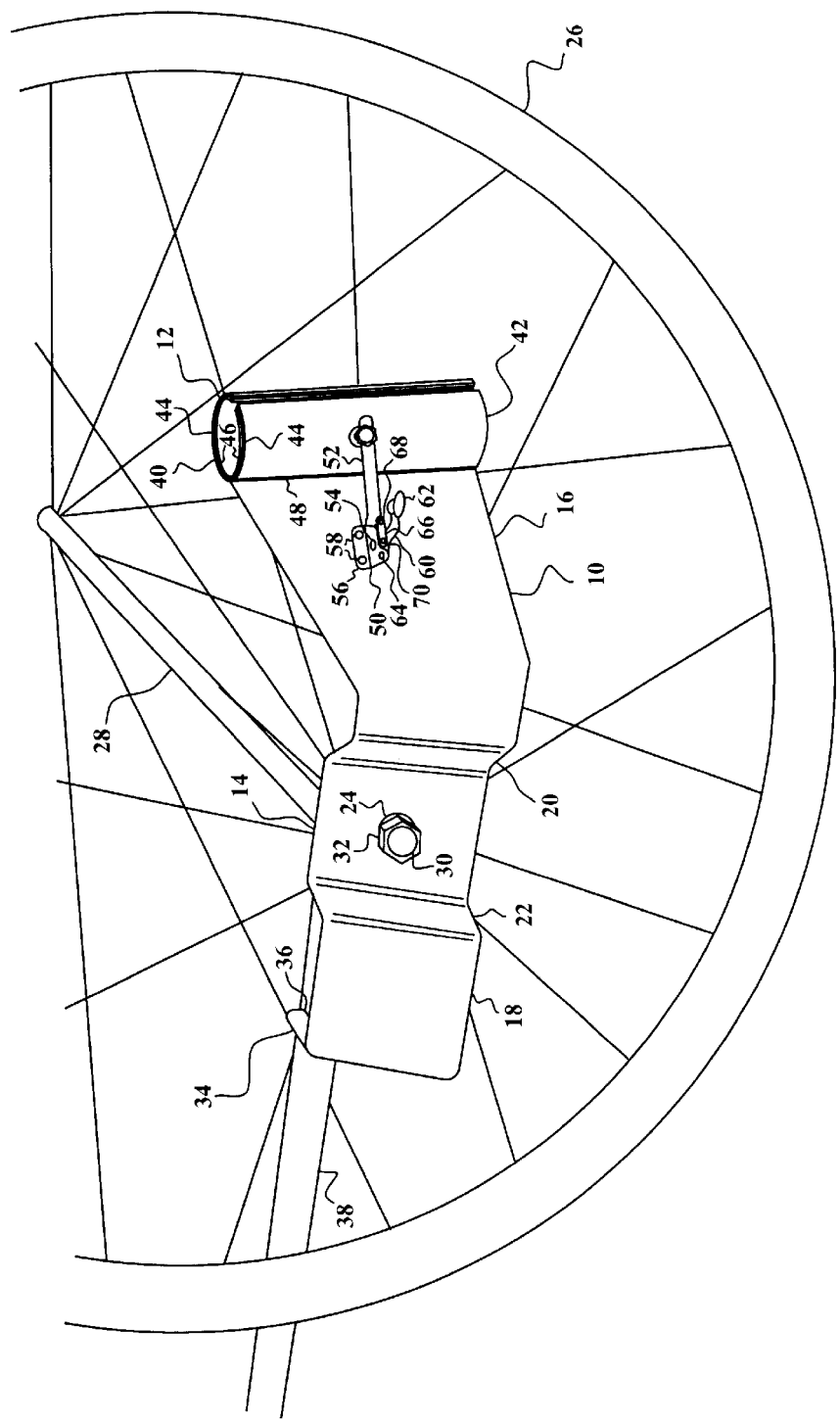
FIG. 1 is a perspective environmental view of the preferred embodiment of the invention, with the cylindrical clamp in a closed position.
Figure 2:
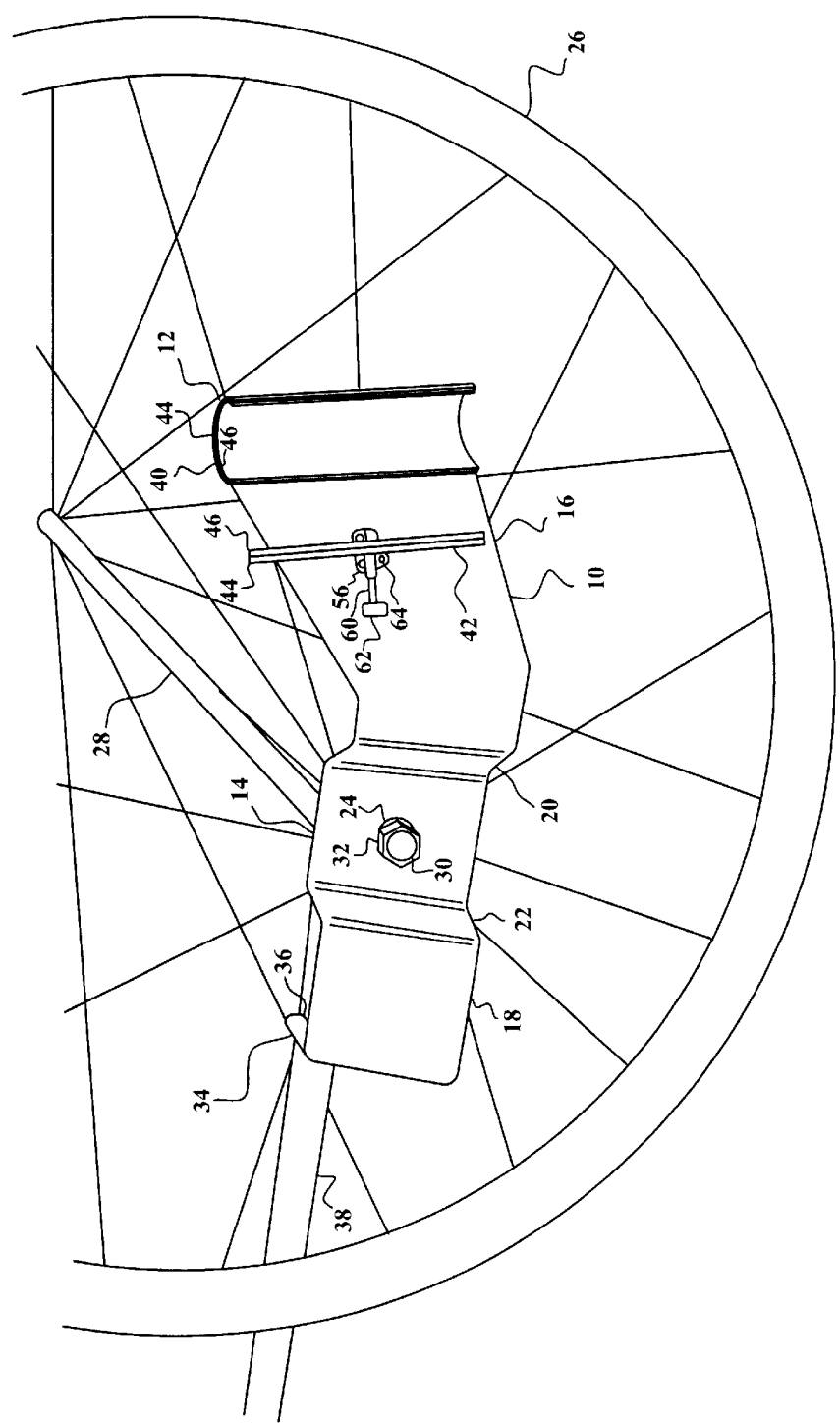
FIG. 2 is a perspective environmental view of the preferred embodiment of the invention, with the cylindrical clamp in an open position.

FIG. 1 is a perspective environmental view of the preferred embodiment of the invention, showing the metal plate 10, with the cylindrical clamp 12 in a closed position. FIG. 2 is a perspective environmental view of the preferred embodiment of the invention, with the cylindrical clamp in an open position. The metal plate has a middle section 14, a first end section 16 to which the cylindrical clamp is attached, and a second end section 18 opposite the first end section. The middle section is joined to the end sections at curved edges 20 and 22. There is a hole 24 in the middle section. The metal plate is fastened to the rear wheel 26 of a bicycle, by placing the middle section against the axle 28 of the wheel, so that a bolt 30 (or other threaded member) extending from the axle passes through the hole. A nut 32 is then placed over the bolt to secure the metal plate to the bicycle. The first and second end sections are generally coplanar. The middle section is parallel to the end sections, but is closer to the bicycle. The tip 34 of the second end section is bent at right angles toward the bicycle, and has a notch 36 which fits over a supporting member 38 of the bicycle, to prevent the metal plate from turning with the wheel.

The cylindrical clamp has a first longitudinal section 40 and a second longitudinal section 42. Each longitudinal section has an outer metal layer 44 and an inner layer 46 of an elastic material, preferably rubber. The first longitudinal section is permanently retained on the edge 48 of the first end section of the metal plate. The second longitudinal section is attached to a locking device 50 that is fastened to the first end section of the metal plate. By means of the locking device, the second longitudinal section can be moved between the closed position shown in FIG. 1 and the open position shown in FIG. 2. The locking device has a first member 52 that at one end is attached to the second longitudinal section of the cylindrical clamp and at an opposite end is attached to a first pivot 54 in a second member 56 of the locking device. The second member is attached to the first end section of the metal plate by bolts 58. A third member 60 of the locking device has a handle 62 at one end and at an opposite end is attached to a second pivot 64 in the second member. A fourth member 66 of the locking device is attached at one end by a third pivot 68 to the first member, and at an opposite end by a fourth pivot 70 to the third member. The locking device is so configured that when it is in a closed position, it cannot be easily opened, except by using the handle on the third member.

Figure 3:
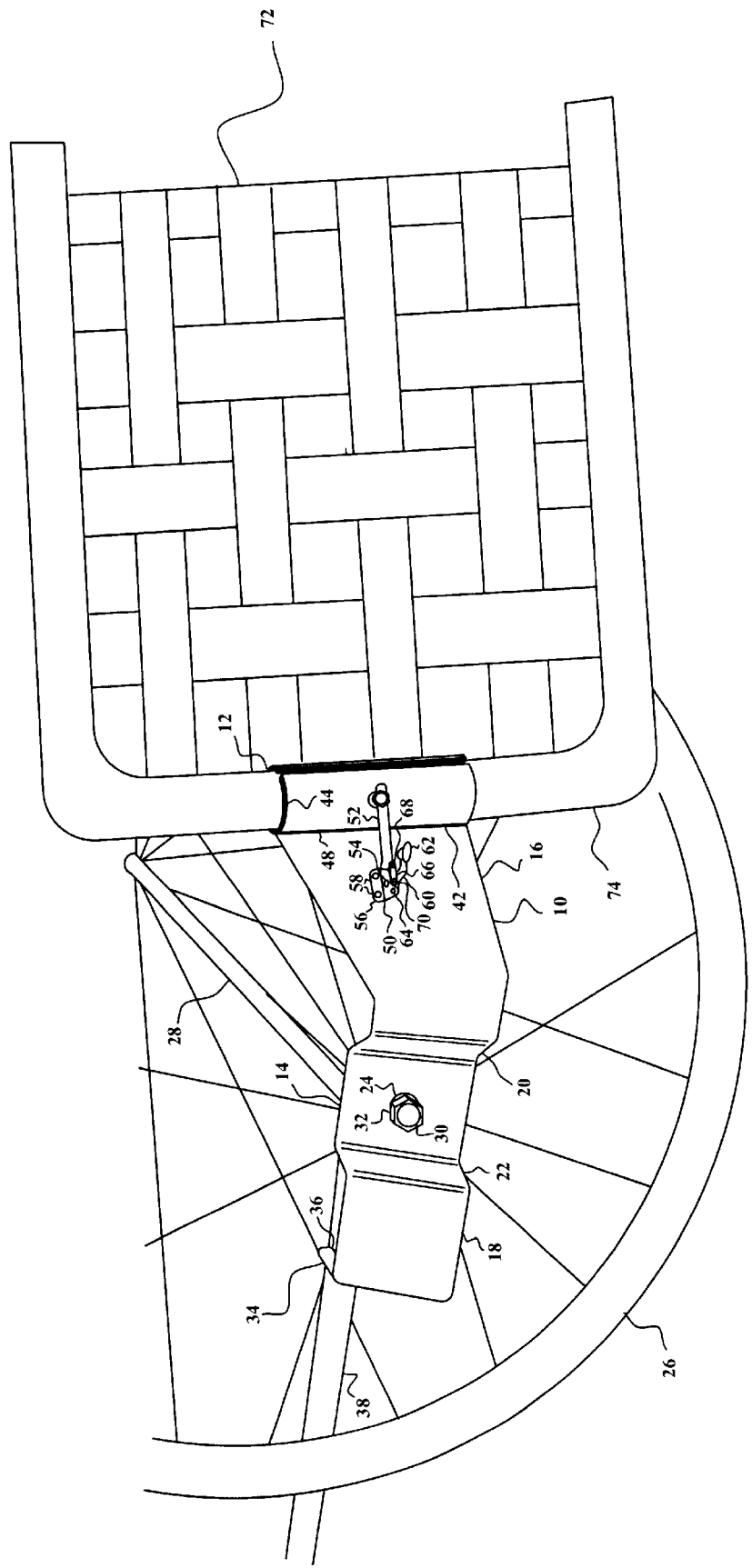
FIG. 3 is a perspective environmental view of the preferred embodiment of the invention, showing a beach chair being retained on a bicycle, by a portion of the metal tubing of the beach chair being retained within the cylindrical clamp.

FIG. 3 is a perspective environmental view of the preferred embodiment of the invention, showing a beach chair 72 being retained on the bicycle, by a portion of the metal tubing 74 of the beach chair being retained within the cylindrical clamp. The rubber inner layer of the sections of the cylindrical clamp has enough friction to prevent the beach chair from sliding.

Figure 4:
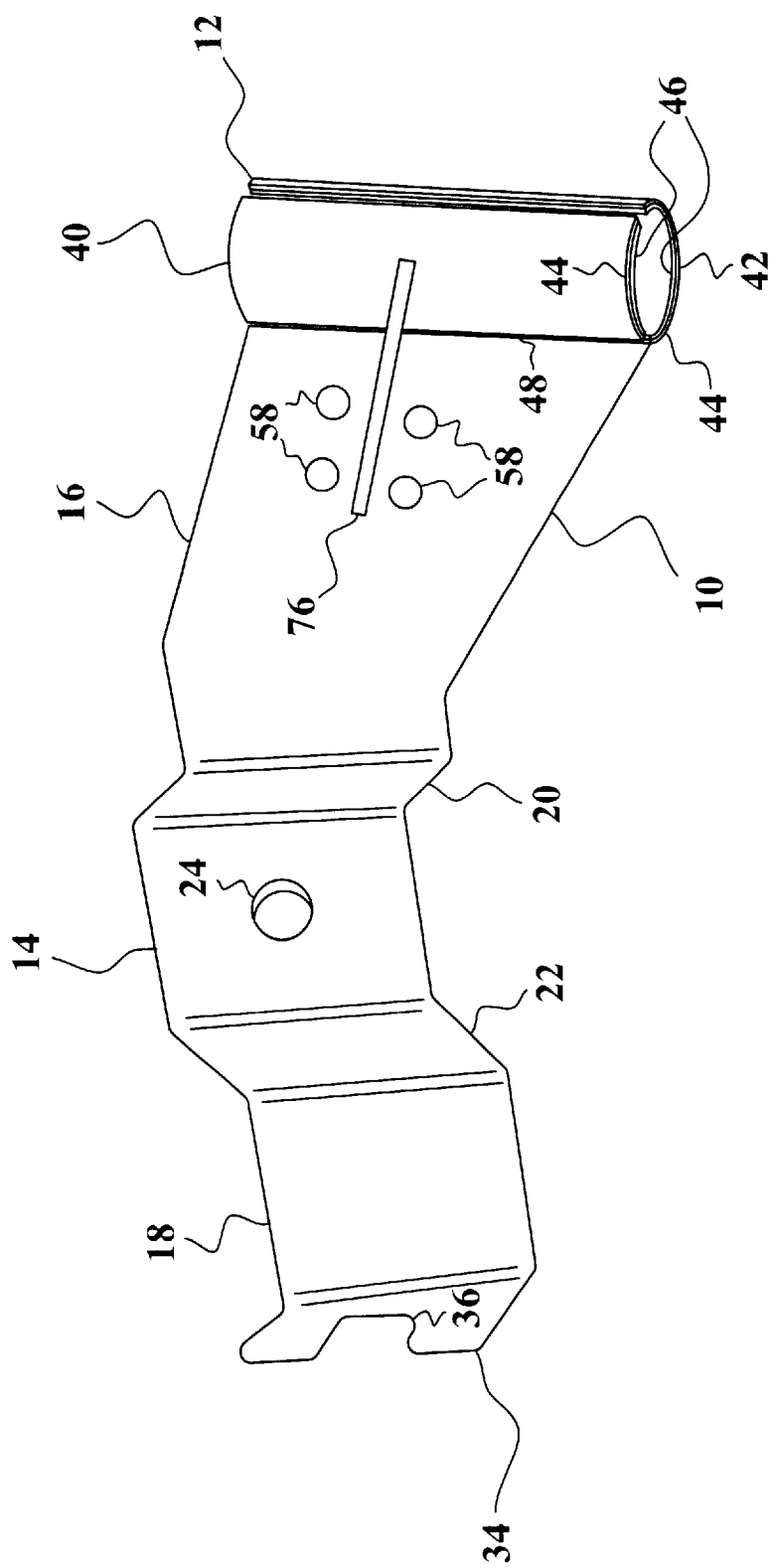
FIG. 4 is a perspective view of the preferred embodiment of the invention, from the opposite side shown in FIG. 1.

FIG. 4 is a perspective view of the preferred embodiment of the invention, from the opposite side shown in the other figures. A brace 76 is welded to both the first longitudinal section of the cylindrical clamp and the first end section of the metal plate. The first longitudinal section is also welded to the first end section at edge 48.

It is to be understood that the present invention is not limited to the sole embodiment described above, but encompasses any and all embodiments within the scope of the following claims.

I claim:

1. An apparatus for retaining an object having a tubular portion on a wheeled vehicle, comprising:
    a metal plate, having a middle section with a hole, a first end section, and a second end section; and
    a cylindrical clamp attached to the first end section, the cylindrical clamp having first and second longitudinal sections that can be brought together in a closed position, and moved apart to an open position, and each longitudinal section of the cylindrical clamp an outer layer made of metal, and an inner layer made of an elastic material;
    wherein the first longitudinal section of the cylindrical clamp is fastened to an edge of the first end section in a fixed position; and
    wherein the second longitudinal section of the cylindrical clamp is fastened to a first member of a locking device, the first member of the locking device is pivotally retained on a second member of the locking device, and the second member of the locking device is fastened to the first end section of the metal plate.

2. The apparatus for retaining an object having a tubular portion on a wheeled vehicle according to claim 1, wherein there is a notch in the second end section of the metal plate.

3. The apparatus for retaining an object having a tubular portion on a wheeled vehicle according to claim 2, including:
    a third member of the locking device having a first end with a handle and a second end at which it is pivotally retained on the second member of the locking device; and
    a fourth member of the locking device that is pivotally retained on both first and third members of the locking device.

4. The apparatus for retaining an object having a tubular portion on a wheeled vehicle according to claim 3, wherein the locking device is so configured that when the cylindrical clamp is in the closed position, it cannot be easily opened without using the handle on the third member of the locking device.

5. The apparatus for retaining an object having a tubular portion on a wheeled vehicle according to claim 4, wherein the metal plate is generally flat, but the middle section lies in a different plane than first and second end sections, with curved edges joining the middle section to the first and second end sections.

6. The apparatus for retaining an object having a tubular portion on a wheeled vehicle according to claim 5, wherein the second end section of the metal plate has a tip that is bent at right angles to the rest of the second end section, and the notch is in the tip.

7. The apparatus for retaining an object having a tubular portion on a wheeled vehicle according to claim 6, wherein the elastic material, that the inner layer of the cylindrical clamp is made of, is rubber.

8. A wheeled vehicle combined with an apparatus for retaining an object having a tubular portion, comprising:
    a wheeled vehicle, having a threaded cylindrical member extending from an axle of at least one wheel;
    a nut that can engage the threaded cylindrical member;
    a metal plate, having a middle section with a hole through which the threaded cylindrical member can pass, a first end section, and a second end section; and
    a cylindrical clamp attached to the first end section, the cylindrical clamp having first and second longitudinal sections that can be brought together in a closed position, and moved apart to an open position, and each longitudinal section of the cylindrical clamp having an outer layer made of metal, and an inner layer made of an elastic material.

9. A wheeled vehicle combined with an apparatus for retaining an object having a tubular portion according to claim 8, wherein:
    the first longitudinal section of the cylindrical clamp is fastened to an edge of the first end section in a fixed position; and
    the second longitudinal section of the cylindrical clamp is fastened to a first member of a locking device, the first member of the locking device is pivotally retained on a second member of the locking device, and the second member of the pivotal clamp is fastened to the first end section of the metal plate;
    there is a third member of the locking device having a first end with a handle and a second end at which it is pivotally retained on the second member of the pivotal clamp;
    there is a fourth member of the locking device that is pivotally retained on both first and third members of the locking device; and the locking device is so configured that when the cylindrical clamp is in the closed position, it cannot be easily opened without using the handle on the third member of the locking device.

10. A wheeled vehicle combined with an apparatus for retaining an object having a tubular portion according to claim 9, wherein the second end section of the metal plate has a tip that is bent at right angles to the rest of the second end section, and a notch is in the tip, the notch being suitably dimensioned and configured to engage a supporting member of the wheeled vehicle to prevent the metal plate from turning.

11. A wheeled vehicle combined with an apparatus for retaining an object having a tubular portion according to claim 10, wherein the metal plate is generally flat, but the middle section lies in a different plane than first and second end sections, with curved edges joining the middle section to the first and second end sections.

12. A wheeled vehicle combined with an apparatus for retaining an object having a tubular portion according to claim 11, wherein the elastic material, that the inner layer of the cylindrical clamp is made of, is rubber.

13. A wheeled vehicle combined with an apparatus for retaining an object having a tubular portion according to claim 12, wherein the wheeled vehicle is a bicycle.

14. A wheeled vehicle combined with an apparatus for retaining an object having a tubular portion according to claim 13, including a beach chair with tubing that can be retained in the cylindrical clamp.

15. A method of transporting a beach chair on a bicycle; comprising the steps of:
  removing a nut from a treaded member extending from an axle of a wheel of a bicycle;
  placing a metal plate against the wheel in a position such that said threaded member passes through a hole in the metal plate, and a supporting member of the bicycle is retained in a notch of the metal plate;
  replacing said nut back over said threaded member to retain the metal plate against said axle;
  placing tubing of a beach chair between longitudinal sections of a cylindrical clamp; and
  pushing a lever that closes the clamp to retain the beach chair on the bicycle.

* * * * *